(12) United States Patent
Huber et al.

(10) Patent No.: US 7,237,261 B1
(45) Date of Patent: Jun. 26, 2007

(54) METHOD, SYSTEM AND GATEWAY ALLOWING SECURED END-TO-END ACCESS TO WAP SERVICES

(75) Inventors: Adriano Huber, Locarno (CH); Urs Loher, Ostermundigen (CH)

(73) Assignee: Swisscom AG, Berne (CH)

( * ) Notice: Subject to any disclaimer, the term of this patent is extended or adjusted under 35 U.S.C. 154(b) by 1198 days.

(21) Appl. No.: 09/592,916

(22) Filed: Jun. 13, 2000

Related U.S. Application Data

(60) Provisional application No. 60/152,356, filed on Sep. 7, 1999.

(30) Foreign Application Priority Data

Jan. 12, 2000 (EP) ................... 00810028

(51) Int. Cl.
*H04L 9/00* (2006.01)
(52) U.S. Cl. .................................................. 726/12
(58) Field of Classification Search ............... 713/201, 713/200, 153; 455/419; 709/245; 726/12, 726/14, 7
See application file for complete search history.

(56) References Cited

U.S. PATENT DOCUMENTS

| 6,240,514 | B1 * | 5/2001 | Inoue et al. ................. 713/153 |
| 6,253,326 | B1 * | 6/2001 | Lincke et al. ................ 713/201 |
| 6,266,704 | B1 * | 7/2001 | Reed et al. ................... 709/238 |
| 6,301,471 | B1 * | 10/2001 | Dahm et al. ................. 455/405 |
| 6,415,329 | B1 * | 7/2002 | Gelman et al. .............. 709/245 |
| 6,480,717 | B1 * | 11/2002 | Ramaswamy ................ 455/445 |
| 6,523,068 | B1 * | 2/2003 | Beser et al. .................. 709/238 |
| 6,546,425 | B1 * | 4/2003 | Hanson et al. ............... 709/227 |
| 6,587,684 | B1 * | 7/2003 | Hsu et al. ..................... 455/419 |
| 6,647,260 | B2 * | 11/2003 | Dusse et al. ................. 455/419 |
| 2003/0182431 | A1 * | 9/2003 | Sturniolo et al. ........... 709/227 |

FOREIGN PATENT DOCUMENTS

WO WO 99/45684 9/1999

OTHER PUBLICATIONS

"WAP Architecture: Wireless Application Protocol Architecture Specification". © 1998 Wireless Application Protocol Forum, Ltd.*

(Continued)

*Primary Examiner*—Kim Vu
*Assistant Examiner*—Thomas Gyorfi
(74) *Attorney, Agent, or Firm*—Pearne & Gordon LLP

(57) ABSTRACT

Method with which a mobile subscriber with a WAP-enabled terminal (1) can access a WAP or WEB server (5),
  wherein said terminal (1) sends a request for said server to a WAP gateway (3)
  wherein the security in the air interface (2) between the said WAP-enabled terminal (1) and said gateway (3) is based on WTLS (Wireless Transport Layer Security),
  wherein the security protocol used by said server (5) is based on the SSL and/or TLS security protocol,
  wherein the conversion between WTLS and SSL and/or TLS is effected in a secured domain of said server (5) administrated by an administrator,
  and wherein the packets sent by said terminal (1) are routed by said gateway (3) to said secured domain, without decrypting all the packets transmitted during a session.

36 Claims, 5 Drawing Sheets

OTHER PUBLICATIONS

"WAP WTP: Wireless Application Protocol Wireless Transaction Protocol Specification". © 1999 Wireless Application Protocol Forum.*

T Dierks, C. Allen. RFC2248: The TLS Protocol Version 1.0. © 1999 The Internet Society. http://www.javvin.com/protocol/rfc2246.pdf.*

T Dierks, C. Allen. RFC2248: The TLS Protocol Version 1.0. © 1999 The Internet Society. http://www.javvin.com/protocol/rfc2246.pdf.*

"Sendo Licences WAP Browser from Digital Mobility" © 2001 Sendo. http://www.sendo.com/Sendo/Company/PressRoom/20010115-LicensesWAPBrowser.htm.*

Khare Rohit. "W* Effect Considered Harmful". © 1999 4k Associates. http://www.4k-associates/4K-Associates/IEEE-L7-WAP-BIG.html.*

Bort, Julie. "A WAP on the Head" © 2000 Network World. http://www.networkworld.com/buzz2000/buzz-wireless.html.*

WAP WTLS: Wireless Application Protocol Wireless Transport Layer Security Specification. © 1999 Wireless Application Forum Ltd.*

S. Kent and R. Atkinson. RFC2406: IP Encapsulating Security Payload (ESP). © 1998 Network Working Group. http://www.ietf.org/rfc/rfc2406.txt.*

Ari Luotonen, "Tunneling SSL Through a WWW Proxy", Dec. 14, 1995, pp. 1-4.

Sami Jourmalainen and Jouni Laine, "Security in the WTLS", Nov. 30, 1999, pp. 1-17; presented at Seminar on Network Security, Helsinki University of Technology, on Nov. 2-3, 1999.

* cited by examiner

| Browser, HTML |
|---|
| HTTP |
| TLS (SSL) |
| TCP(UDP)/IP |
| Any |

| WAE |  |  |  |  |
|---|---|---|---|---|
| WSP |  |  |  |  |
| WTP |  |  |  |  |
| WTLS |  |  |  |  |
| WDP |  |  |  |  |
| GSM | IS-136 | CDMA | PHS | etc.. |

Fig. 1

METHOD, SYSTEM AND GATEWAY ALLOWING SECURED END-TO-END ACCESS TO WAP SERVICES

This application claims priority of the provisional patent application U.S. 60/152,356 filed on Sep. 7, 1999 and of the European patent application EP0810028.1, the contents of which are incorporated by reference.

TECHNICAL FIELD

The present invention concerns a method with which a mobile subscriber with a WAP-enabled terminal can access a WAP or WEB server.

BACKGROUND OF THE INVENTION

WAP (Wireless Application Protocol) servers, offering WAP-based services, are already known. Especially, WAP-based services in the field of e-commerce and of financial institutes are available.

Such services demand a secured transmission of the packets between the end-user and the server of the service provider. The usual solution recommended by the WAP forum makes use of the WTLS (Wireless Transport Layer Security) protocol layer; this method can, however, only be used to secure the packet transmission between the terminal and the gateway (possibly administered by a mobile network operator). In this gateway, a conversion of the protocol to the security protocol SSL 3.1 or to the TLS 1.0 is effected.

The principle of a data transmission secured by this method is shown schematically in FIG. 2. Reference number 1 shows a WAP-enabled terminal, for example a WAP-enabled GSM (Global System for Mobile Communication) mobile phone, that can connect over a digital mobile communication network 2 to a gateway administrated by the operator of this network. The terminal 1 contains a browser. Number 5 shows a server of a service provider, for example a financial institute or a provider in the field of e-commerce. This server can access a database 51 where WEB and/or WAP pages are stored. The WEB or WAP pages can contain for example HTML, WML, JAVA-script, WML-script, etc. documents.

In order to access a WEB and/or WAP page in database 51, a user of terminal 1 has to send a request secured by WTLS services through the gateway 3 to server 5. This request is decrypted in gateway 3 through all the protocol layers of a converter module, then it is converted into a TLS or SSL-secured request that is sent over a TCP/IP network 4 to the server 5. In server 5, another converter module may be provided for converting this request into its own format that can be understood by the database administration system 51. The answer of server 5, for example the contents of a WEB and/or WAP page, is conveyed in the other direction through gateway 3, where it is converted, to the terminal 1.

This method does not allow for real end-to-end encryption; data and packets need to be decrypted and re-encrypted in gateway 3 to effect is the protocol conversion. For many applications, such a security breach is however not acceptable.

One aim of the present invention is to propose a newer, more secure means of data transfer between a terminal and a WEB or WAP server.

Another aim is to propose a new method that allows end-to-end secured connection between a WAP-enabled terminal and a WEB or WAP server.

Another aim is to provide a new method that can be used with any WAP-enabled terminal using WTLS, specifically with terminals employing an authenticating of service based on a RSA key, on X.509v3 certificates, on RC5 or other security protocols according to WAP or WTLS or further digital certificates, respectively.

SUMMARY OF THE INVENTION

According to the present invention, these aims are achieved specifically with a method in which said terminal sends a request for said server to a WAP gateway, the security in the air interface between said WAP-enabled terminal and said gateway being based on WTLS (Wireless Transport Layer Security), said server containing a SSL and/or TLS protocol layer, the conversion between WTLS and SSL and/or TLS being effected in a secured domain administrated by the administrator of said server, and where the packets that are sent by said terminal are routed by said gateway to said secured domain without decrypting all the packets transmitted during a session.

The packets are transmitted through the gateway through a so-called tunnel layer without being decrypted. The contents thus remain confidential even for the operator of the gateway. The packets are then only decrypted at the server of the service provider in a proxy (a so-called E2ES-Proxy) and verified by a certificate of a trusted third party.

Furthermore these aims are achieved by a method with which a mobile subscriber with a WAP-enabled terminal can access a WEB or WAP server, said terminal sending a request for said server to a WAP gateway in which a browser in said terminal extracts the port number of the requested WEB or WAP pages and copies it into the packets sent to said gateway, and said packets in said gateway being routed depending on this port number.

Furthermore, these aims are achieved by securing the request that is sent by a terminal over a gateway to a WEB or WAP server with end-to-end WTLS.

Preferably, in the gateway one can differentiate between sessions that are to be handled conventionally and sessions to be routed according to the present invention.

BRIEF DESCRIPTION OF THE DRAWINGS

Hereafter is a more detailed description of preferred embodiments of the invention with reference to the attached drawings, in which:

FIG. 1 compares the protocol layers of a WAP protocol stack and of an internet protocol stack.

DETAILED DESCRIPTION

Figure 2:
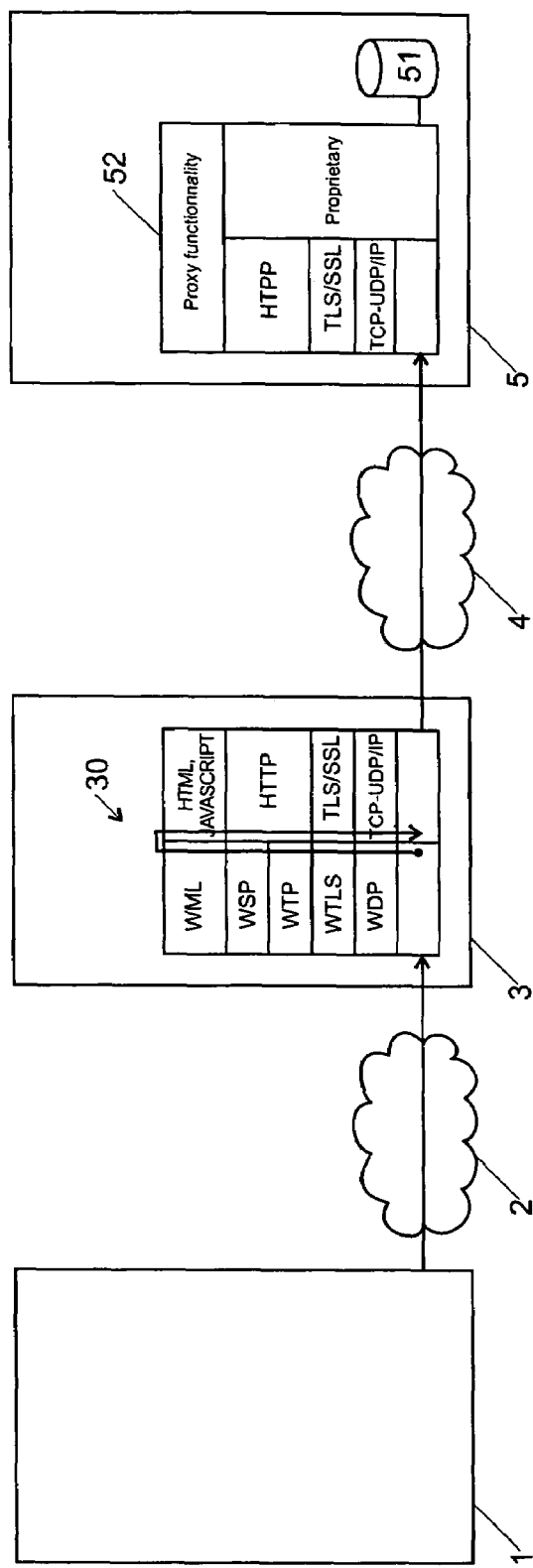
FIG. 2 as described above shows the principle of secured data transmission according to the usual WAP protocol.
Figure 3:
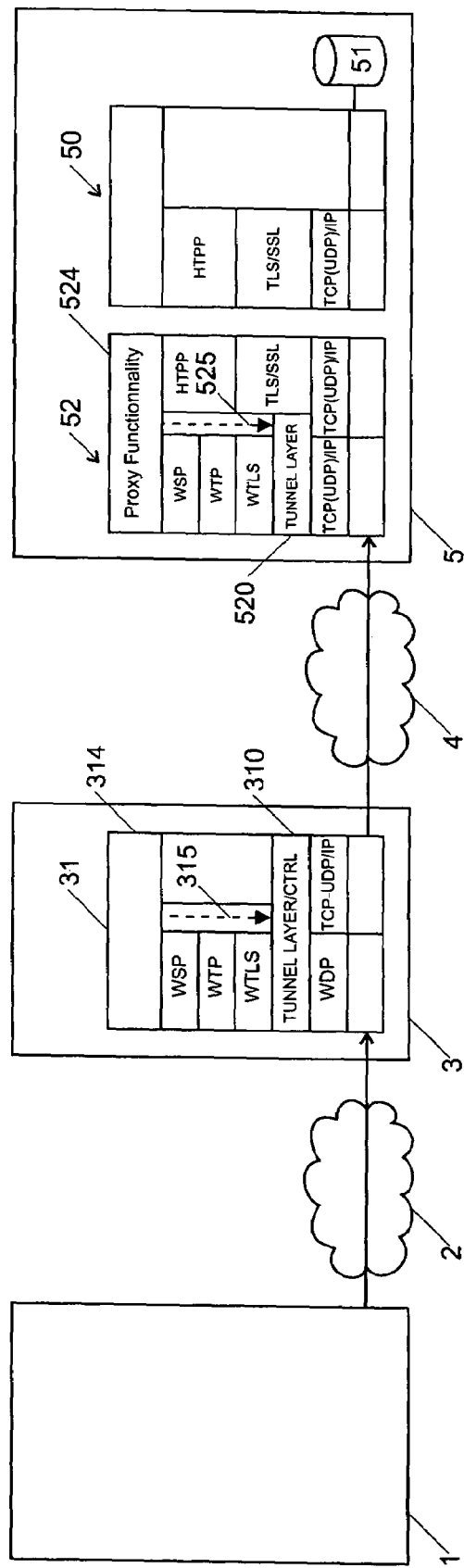
FIG. 3 shows the principle of a secured data transmission according to a first embodiment of the invention.

FIG. 3 shows the principle of a first embodiment of the invention. This figure shows a registered WAP-enabled terminal 1 in a digital mobile phone network, for example a WAP-enabled GSM mobile phone or a WAP-enabled portable computer. With this device a program, for example a WAP browser, can be executed and can connect as a client to a WEB or WAP server 5 and therefore can access data on this server.

The WEB or WAP server 5 contains WML and/or HTML-pages that are offered for example by a service provider (for example a financial institute and/or a provider in the field of e-commerce). Often the service providers as well as the end users wish that the session built when a user accesses several pages is secured. Especially, it is often necessary for some data transmitted bi-directionally between terminal 1 and server 5 to be end-to-end secured and for no third party, not even the operator of the mobile phone network, to be able to decrypt that data. Furthermore, a mutual authenticating of the service provider and of the mobile subscriber is necessary.

The user of the terminal can access a secured page, for example for a transaction, by clicking on the corresponding URL of a secured or non-secured page. The URL of the page defined by the service provider reads for example http://www.sp1.com:50443, where http://www.sp1.com is the URL-address of the service provider and 50443 his port number. In the WAP, on the other hand, the sequential port number fields 920x are used.

According to the invention, the URL in the WML and/or HTML pages of the service provider is written in such a way as to determine the desired kind of session (end-to-end secured, standard secured, non-secured), from this URL, among others from the URL address and/or the port number.

Reference number 3 also shows a gateway connected to the mobile phone network 2. The gateway receives the packets from subscriber 1 and decrypts the first packet or packets in each session until an application 314 can extract the port number and the URL of the requested WEB and/or WAP pages from the packets.

As soon as these indications have been found, the application 314, based on the information given by the administrator of the gateway, decides how the packets should be handled. Specifically, the application determines whether the session between the terminal 1 and the server 5 should be end-to-end secured. This is the case, for example, if the port number (for example 50443) is in a list built by the administrator of the gateway.

Gateway 3 uses an additional protocol layer 310 (tunnel layer) that is controlled by the application 314 (arrow 315). If the session is to be secured, the tunnel layer 310 is controlled so that all following packets of the session are transparently led through the gateway and routed to the target address of server 5, without being converted and, more importantly, without being decrypted.

The session's packets, still secured with WTLS, are then routed over network 4 and received by server 5 in the secured domain of the service provider. The network 4 can for example consist of the internet or of a rented telephone line. The server 5 comprises a proxy 52, to be explained later, a conventional gateway 50, and a database 51, where WEB and/or WAP contents are stored.

The proxy 52 in server 5 of the service provider is constructed in such a way that it can receive WTLS secured sessions. It comprises preferably a complete WAP protocol stack and can be realized by an expert by easily adapting standard software. In this proxy, received WTLS-secured WDP datagrams are examined with the certificate of a trusted third party, decrypted and converted to normal TCP-IP datagrams, where the http session is optionally SSL-secured. The converted TCP-IP packets are routed to the WAP or WEB server 50, which may possibly implement another protocol conversion, so that the received request can be processed by database system 51.

Alternatively, the datagrams can be decrypted and encrypted with a session key, the keys of which are generated with the help of a certified, public key during the key agreeing phase.

The answer from WEB or WAP server 50, for example the requested WEB and/or WAP page, is sent by server 50 in the other direction, converted and secured with WTLS services in proxy 52 and routed through the "tunnel layer" 310 in gateway 31 to the terminal 1 of the subscriber, where the complete connection between server 5 and terminal end user 1 is secured with WTLS.

Datagrams that do not need end-to-end secured data transmission because of the contained URL and/or the port number, are decrypted in gateway 31 according to the conventional solution as recommended by the WAP forum through all layers of protocol by the gateway 2, re-secured with TLS/SSL and routed to the URL address indicated in the packets. For example, sessions with port number 80 are handled and sent on like normal HTTP sessions.

Answers from server 5 (for example the requested WEB and/or WAP pages) not needing any WTLS securing between server and gateway 3 are dealt with by the proxy application 524 through a tunnel layer in the proxy (arrow 315) and only secured with WTLS services in the gateway 3.

This embodiment does not require any change of the browser in terminal 11 and demands only a relatively simple proxy 53, capable of receiving WTLS sessions, with the service provider 5. However, the software implementation in the gateway can prove to be difficult.

Figure 4:
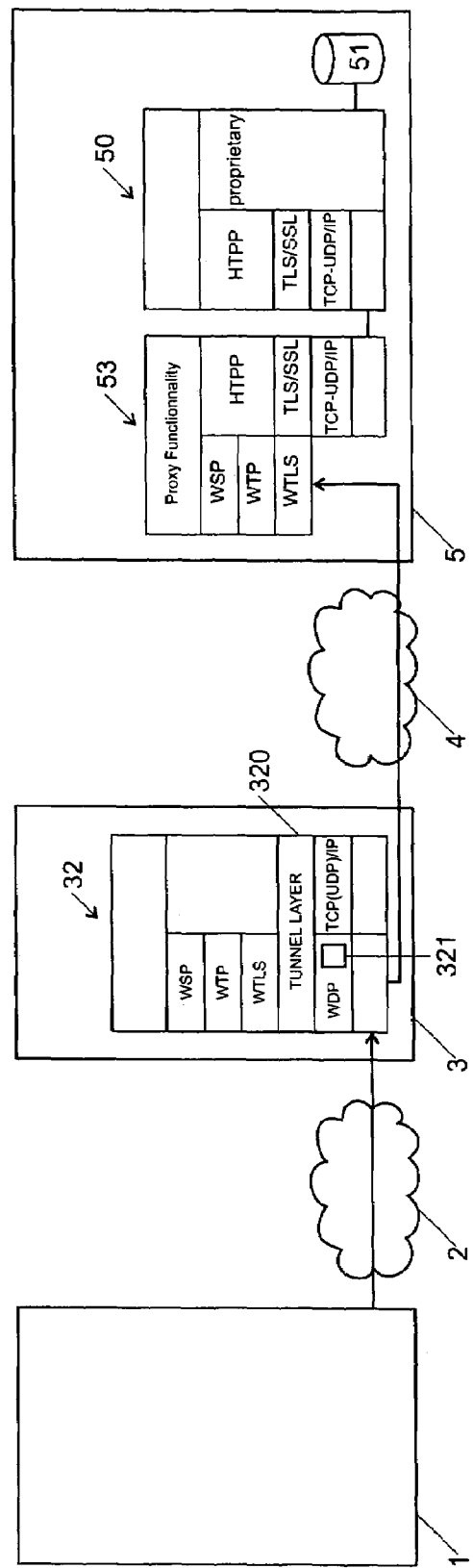
FIG. 4 shows the principle of a secured data transmission according to a second embodiment of the invention.

The second embodiment, shown in FIG. 4, allows this problem to be avoided by an easily implementable modification of the application (for example the browser) in terminal 1. In this embodiment, the URL address and the port number of the requested WEB and/or WAP page are copied by the browser 10 into each packet (WDP datagram) of the session. These packets are then sent over mobile phone network 2 to gateway 3 where the port number and the URL are analyzed to determine the further handling of the packets.

The advantage of this embodiment consists in the fact that the analyses and further handling of the packets can be carried out in the lower layers of the protocol, amongst other in the WDP and/or WTLS layers, and that therefore only minimal modifications of the gateway 3 are necessary.

A table 321 in gateway 3 or in a router (not shown) in front of the gateway indicates how the packets are to be handled according to port number and URL, and especially which packets are to go transparently through the tunnel layer 320. This table can preferably be configured and adapted by the administrator of gateway 3 without having to restart the gateway in order to be able to update the configuration during its operation. Data in the table can preferably only be changed by the administrator or people with administrator authority.

The table in gateway 3 could contain the following lines:

| | Entered URL address | | New address (issued by Gateway) | | |
|---|---|---|---|---|---|
| | Address | Port number | Address | Port number | Remarks |
| 1 | 138.10.20.30 | 8040 | 140.50.60.70 | 12345 | Packets with this address are sent transparently to the new address. The port number is replaced (Mapping). |
| 2 | *.*.*.* | 50443 | *.*.*.* | 50443 | Star wildcard allows to set the same conditions for all servers with the same port number. |
| 3 | 138.10.20.40 | * | 138.10.20.40 | * | Same as above, but without DNS lookup |
| 4 | www.sp1.com | * | www.sp1.com | * | All URLs of the sp1 have to go through the tunnel layer |
| 5 | www.sp1.com | 80 | www.sp1.com | 80 | All connections with port number 80 through tunnel layer |
| 6 | www.sp1.ch | 50443 | www.sp1.ch | 50443 | sp1 demands that all sessions with port number 50443 be sent through the tunnel layer |
| 7 | www.sp2.ch | 443 | www.sp2.ch | 443 | sp2 demands that all sessions with port number 443 be sent through the tunnel layer. Therefore, no SSL is used with port 443. SSL can then be used by the proxy for example. |
| 8 | ... | | | | |

The administrator of the gateway 3 will preferably offer a range of URL addresses and/or port numbers to the service provider. Service provider SP1, SP2 etc. can then reserve for themselves one or several URL, or port numbers or combinations of both, and advise the administrator 3 to send on transparently packets with this URL and/or port number.

Figure 5:
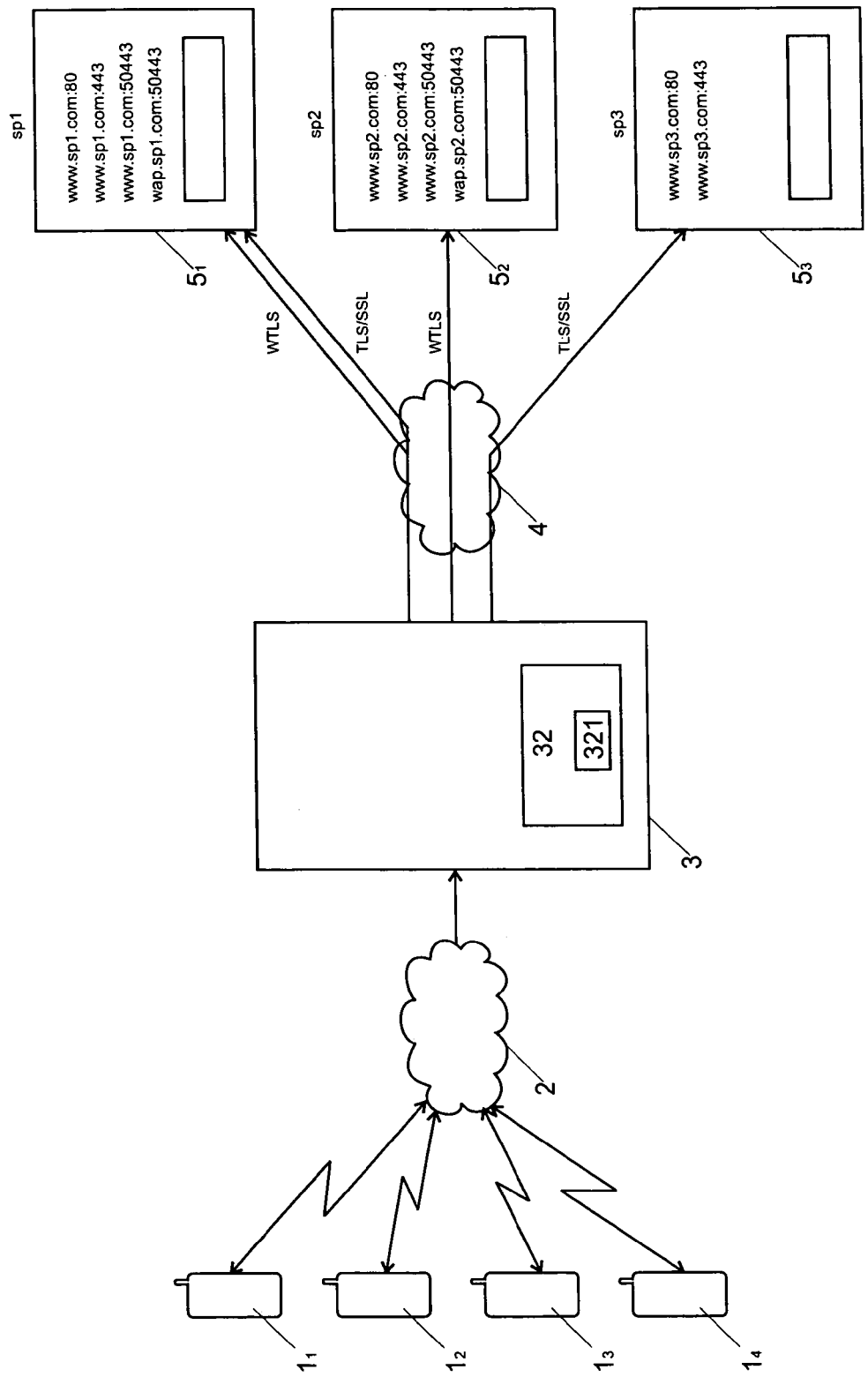
FIG. 5 shows the principle of a secured data transmission according to a third embodiment of the invention.

The FIG. 5 shows as an example how the packets sent by different end users $1_1$ to $1_4$ are handled by gateway 3 according to their URL address and/or port number.

The described system in this example consists of three servers $5_1$, $5_2$ and $5_3$ of three different service providers sp1, sp2 and sp3. The following four pages are stored in the first server $5_1$ ($5_2$ resp.):

a non-secured WEB page with the address www.sp1.com: 80 (www.sp2.com:80 resp.)

a WEB page with the address www.sp1.com: 443 (www.sp2.com: 443 resp.), SSL secured only (no end-to-end security)

a WEB page with the address www.sp1.com: 50443 (www.sp2.com: 50443 resp.), WTLS secured (end-to-end security)

a WAP page with the address www.sp1.com: 50443 (www.sp2.com: 50443 resp.), WTLS secured (end-to-end security)

In server $5_3$ of the third service provider sp3 only two pages are stored:

a non-secured WEB page with the address www.sp3.com: 80 a WEB page with the address www.sp1.com: 443, SSL secured only (no end-to-end security)

The first user $1_1$ wants to access the secured pages www.sp1.com:443 and www.sp1.com:50443 of the service provider sp1 in server $5_1$, by sending a GET(URL) request with corresponding URLs to gateway 3. The gateway 3 recognizes, on the basis of the table 321 and the URL and/or port number contained in the datagram, what security is required by these pages. In the first case (SSL security), all datagrams of the session are decrypted in gateway 3 and a conversion from WTLS to SSL is executed. In the second case (end-to-end security with WTLS), all datagrams of the session are sent on transparently to server $5_1$ without being decrypted.

The second user $1_2$ wants to access the secured pages www.com:50443 sp1. and www.sp1.com:50443 of the service provider sp2 in server $5_2$ demanding end-to-end security. Datagrams with this address are recognized in gateway 3 and sent on transparently through the tunnel layer to the server $5_2$.

The third user $1_3$ wants to access the page www.sp3.com: 443 of the service provider sp2 in server $5_2$, demanding a security ensured by TLS/SSL. WTLS secured datagrams with this address are recognized in gateway 3, converted through all layers of the protocol stack, secured with TLS/SSL and sent on to the server $5_3$.

The fourth user $1_4$ wants to access the non-secured page www.sp3.com:80 of the service provider sp2 in server $5_2$. WTLS secured packets with this address are recognized in gateway 3, converted through all layers of the protocol stack sent on to the server $5_3$, without securing them over the network 4.

This embodiment demands only minimal adaptations of the gateway 3. However, the browser applications in the terminals 1 have to be slightly adapted, which can prove to be difficult for many providers.

We will now describe a third embodiment of the invention avoiding this disadvantage.

In this embodiment, sessions needing end-to-end security are recognized according to the URL address and/or the port number as in the first and second embodiment. Instead of sending on the sessions transparently through the tunnel layer, the gateway in this case sends to the terminal 1 a standardized redirect command with the address and port number of the service provider indicated in the table and other parameters for the identification of gateway 5, such as a dial-in number.

The transmission address (address, port number, dial-in number etc.) in the redirect command is preferably extracted from a document available from a WEB or WAP server 5. The redirect command can also contain this or another document or the address of such a document in which the transmission address is contained. In the document, different address areas can preferably be indicated with a string pattern, for example with an * asterix.

The application in terminal 1 receiving this redirect command reacts by sending now the packets previously sent to the gateway 3 again directly to the indicated address of the service provider indicated in the redirect command.

All packets in the session are directly transmitted between the terminal 1 and the server 5 until the end user sends another URL that cannot be proceeded by the server 5 (for example if the requested page is not located on this server). In this case, the session is interrupted by the server 5 and the following packets are re-sent again to the gateway 3.

If no end-to-end security is necessary, no redirect command is sent by the gateway 3. In this case, all packets during the secured session are sent through the gateway 3.

The invention claimed is:

1. A method by which a mobile subscriber with a WAP-enabled terminal can access a WEB or WAP server, comprising the steps of:
    said terminal sending a request for said server to a WAP gateway, wherein encryption in the wireless interface between said WAP-enabled terminal and said gateway is based on WTLS (Wireless Transport Layer Security), and wherein an encryption protocol used by said server is based on one or both of the SSL or the TLS security protocol; and
    converting between WTLS and said one or both of the SSL or the TLS security protocol in a secured domain of said server administrated by an administrator,
    wherein a plurality of WTLS encrypted packets sent by said terminal are routed by said gateway to said secured domain with said gateway not decrypting any portion of at least some number of the encrypted packets transported during a session.

2. Method according to claim 1, wherein said gateway routes said packets to a proxy in said secured domain, said proxy using at least one protocol layer of the WAP protocol.

3. Method according to claim 2, wherein said packets are routed according to one or both of the URL or the domain name of the requested page in said gateway.

4. Method according to claim 2, wherein said packets are routed by said gateway according to a port number embedded in said packets.

5. Method according to claim 4, wherein said encrypted packets are routed according to different port numbers to different secured domains.

6. Method according to claim 4, wherein said port number is extracted in an application layer of said gateway from the URL of the requested page.

7. Method according to claim 6, wherein said port number is extracted from only a restricted number of packets during a session, and wherein the routing of at least one of the following packets depends on this extracted port number.

8. Method according to claim 7, wherein a proxy server in said secured domain extracts one or both of the URL or the port number of the received packets and wherein the proxy server sends back a command to said gateway if it receives a packet with a different one or both of an URL or a port number.

9. Method according to claim 4, wherein said port number is extracted from said URL of the required web page in said terminal.

10. Method according to claim 9, wherein said port number is extracted by a browser from said URL of the required web page.

11. Method according to claim 8, wherein the browser in said terminal only copies said port number in said packets if an end-to-end secured connection is requested.

12. Method according to claim 3, wherein said packets in said gateway are routed to a secured domain if said port number is comprised in a predefined range.

13. Method according to claim 3, wherein said gateway sends a redirect command to said terminal if an end-to-end secured connection is requested.

14. Method according to claim 13, wherein said redirect command is time-limited.

15. Method according to claim 13, wherein a proxy server in said secured domain extracts one or both of the URL or the port number of the received packets and sends a redirect command back to said terminal as soon as the session is to be routed to said gateway.

16. Method according to claim 13, wherein said redirect command contains a forwarding address which is extracted from a document made accessible by said WEB or WAP server.

17. Method according to claim 13, wherein said redirect command contains a document which includes the forwarding address.

18. A method according to claim 1, by which a mobile user with a WAP-enabled terminal can access a WEB or WAP server, wherein
    said terminal sends a request for said server to said WAP gateway, wherein a browser in said terminal extracts the port number of the demanded WEB or WAP page and copies it to packets sent to said gateway; and wherein
    said packets are routed, using said gateway, according to this port number.

19. The method of claim 1, wherein said gateway determines whether an end-to-end secured routing is requested according to the URL of the requested page.

20. A gateway comprising:
    means for receiving packets WTLS-encrypted according to the WTLS protocol from WAP-enabled terminals;
    means for converting said packets into SSL-encrypted requests; and
    means for transmitting said SSL-encrypted requests to a receiving server, wherein said gateway can recognize WTLS-encrypted packets that are to be sent on transparently and can convert said WTLS-encrypted packets into said SSL-encrypted request without decrypting the information contained in at least some number of said WTLS-encrypted packets.

21. Gateway according to claim 20, wherein said WTLS-encrypted packets are routed according to one or both of the URL or the domain name of the requested page.

22. Gateway according to the claim 20, wherein said WTLS-encrypted packets are routed according to the port number of the requested page.

23. Gateway according to claim 22, wherein said WTLS-encrypted packets are routed to different secured domains according to different port numbers.

24. Gateway according to claim 22, wherein said port number is extracted from the URL of the requested page in an application layer of said gateway.

25. Gateway according to claim 22, wherein
said port number is extracted during a session only from a restricted number of WTLS-encrypted packets, and wherein
the routing of at least one following WTLS-encrypted packet depends on said extracted port number.

26. The gateway of claim 20, wherein said gateway determines whether an end-to-end secured routing is requested according to the URL of the requested page.

27. A method for performing end-to-end secure data transfer between a terminal and a server, wherein said terminal is connected to said server via a wireless connection between said terminal and a gateway, said method comprising the steps of:
said terminal requesting a secure communication session with said server via said gateway, said requesting including the steps of:
said terminal generating a request including request packets encrypted using a WTLS protocol,
said terminal sending said request to said gateway,
said gateway forwarding said request to said server or to another server, wherein said gateway does not decrypt all of said request packets, and
said server or said another server decrypting some number of said request packets using said WTLS protocol;
and
said server or said another server serving data to said terminal via said gateway, said serving including the steps of:
said server or said another server sending said data including data packets encrypted using said WTLS protocol to said gateway;
said gateway forwarding said data packets to said terminal, wherein said gateway does not decrypt any portion of at least some number of said data packets; and
said terminal decrypting said data packets using said WTLS protocol.

28. The method of claim 27, wherein said gateway must decrypt some but not all of said request packets to forward said request to said server or said another server.

29. The method of claim 28, wherein said gateway must decrypt some but not all of said data packets to forward said data to said terminal.

30. The method of claim 27, wherein a browser on said terminal provides information to said gateway for forwarding said request to said server or said another server without said gateway decrypting any of said request packets.

31. The method of claim 30, wherein said information includes one or more of: a port number, a domain name, and an URL.

32. A system for performing end-to-end secure data transfer between a terminal and a server, said system comprising:
a gateway adapted for receiving a request for a secure session with said server from the terminal, wherein said request includes request packets encrypted using a WTLS protocol, and wherein said gateway is also adapted for forwarding said request to said server or to another server, wherein said gateway does not decrypt all of said request packets for performing said forwarding;
said server or said another server adapted for decrypting some number of said request packets using said WTLS protocol and also adapted for serving data including data packets encrypted using said WTLS protocol to said gateway, wherein
said gateway forwards said data to said terminal without decrypting any portion of at least some number of said data packets, and wherein
the terminal decrypts said data packets using said WTLS protocol.

33. The system of claim 32, wherein said gateway must decrypt some but not all of said request packets to forward said request to said server or said another server.

34. The system of claim 33, wherein said gateway must decrypt some but not all of said data packets to forward said data to the terminal.

35. The system of claim 33, wherein a browser on the terminal provides information to said gateway for forwarding said request to said server or said another server without said gateway decrypting any of said request packets.

36. The system of claim 35, wherein said information includes one or more of a port number, a domain name, and an URL.

* * * * *

UNITED STATES PATENT AND TRADEMARK OFFICE
CERTIFICATE OF CORRECTION

PATENT NO.       : 7,237,261 B1                                           Page 1 of 1
APPLICATION NO.  : 09/592916
DATED            : June 26, 2007
INVENTOR(S)      : Adriano Huber et al.

It is certified that error appears in the above-identified patent and that said Letters Patent is hereby corrected as shown below:

On the Title page, section (56) References Cited, Other Publications, Please insert --R. Fielding, J. Gettys, J. Mogul, H. Frystyk, T. Berners-Lee. RFC2068: "Hypertext Transfer Protocol - HTTP/1.1" ©1997 Internet Engineering Task Force. http:/www.ietf.org/rfc/rfc2068.txt--.

Signed and Sealed this

Fifteenth Day of January, 2008

JON W. DUDAS
*Director of the United States Patent and Trademark Office*